(12) United States Patent
Bauchot et al.

(10) Patent No.: US 8,935,609 B2
(45) Date of Patent: Jan. 13, 2015

(54) METHOD AND SYSTEM TO SECURE THE DISPLAY OF ADVERTISEMENTS ON WEB BROWSERS

(75) Inventors: Frederic Bauchot, Saint-Jeannet (FR); David Loupia, Carros (FR); Gerard Marmigere, Drap (FR); Joaquin Picon, St. Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 12/325,391

(22) Filed: Dec. 1, 2008

(65) Prior Publication Data
US 2009/0158140 A1 Jun. 18, 2009

(30) Foreign Application Priority Data
Dec. 18, 2007 (EP) .................................. 07301697

(51) Int. Cl.
*G06F 17/00* (2006.01)
*G06F 17/30* (2006.01)
*G06Q 30/02* (2012.01)

(52) U.S. Cl.
CPC .......... *G06F 17/30899* (2013.01); *G06Q 30/02* (2013.01)
USPC ........... 715/273; 715/234; 715/239; 715/249; 715/255; 715/271

(58) Field of Classification Search
CPC ........................... G06F 17/212; G06F 17/2264
USPC ................. 715/239, 273, 234, 249, 255, 271; 382/173
See application file for complete search history.

(56) References Cited

U.S. PATENT DOCUMENTS

| | | | | |
|---|---|---|---|---|
| 6,393,407 B1 * | 5/2002 | Middleton et al. | ......... | 705/14.73 |
| 6,978,418 B1 * | 12/2005 | Bain et al. | ..................... | 715/205 |
| 7,065,712 B2 * | 6/2006 | Muto et al. | .................... | 715/760 |
| 7,617,294 B1 * | 11/2009 | Harding | ....................... | 709/217 |
| 2001/0013039 A1 * | 8/2001 | Choi | .......................... | 707/104.1 |
| 2002/0133396 A1 * | 9/2002 | Barnhart | ......................... | 705/12 |
| 2002/0191867 A1 * | 12/2002 | Le et al. | ........................ | 382/300 |
| 2003/0023640 A1 * | 1/2003 | Challenger et al. | ........... | 707/530 |
| 2005/0041858 A1 * | 2/2005 | Celi et al. | ..................... | 382/173 |
| 2005/0262438 A1 * | 11/2005 | Armstrong et al. | ............ | 715/523 |
| 2006/0206919 A1 * | 9/2006 | Montgomery et al. | ........... | 726/2 |
| 2006/0230100 A1 * | 10/2006 | Shin et al. | ..................... | 709/203 |
| 2008/0163128 A1 * | 7/2008 | Callanan et al. | .............. | 715/856 |
| 2008/0222273 A1 * | 9/2008 | Lakshmanan et al. | ......... | 709/219 |
| 2008/0235594 A1 * | 9/2008 | Bhumkar et al. | .............. | 715/738 |

OTHER PUBLICATIONS

VelocitySC, Online Tool to convert Web Page to Image, Feb. 13, 2006, http://forums.digitalpoint.com/showthread.php?t=58050.*

(Continued)

*Primary Examiner* — Chau Nguyen
(74) *Attorney, Agent, or Firm* — Jean M. Sullivan; Hoffman Warnick LLC (57) ABSTRACT

A method and system to secure the display of advertisements on web browsers. A method according to an embodiment includes: interpreting a markup file in a virtual machine, converting displayable elements of the markup file to one or a plurality of images and constructing a modified markup file comprising the at least one image file and a scripting language code adapted to cause a user terminal upon which it is executed to transmit coordinate information defining the position of a user-controlled cursor and action information defining a clicking action.

23 Claims, 7 Drawing Sheets

(56) References Cited

OTHER PUBLICATIONS

Velocity Services Corporation, Velocity Webshots, Feb. 13, 2006, http://web.archive.org/web/20060213031715/http://webshots.velocitysc.com.*

Velocity Services Corporation, Velocity Webshots Sandbox, Feb. 4, 2006, http://web.archive.org/web/20060204085256/webshots.velocitysc.com/WeshotSandbox.aspx.*

Webopedia, Web Services Definition, Feb. 14, 2011, http://www.webopedia.com/TERM/W/Web_Services.html.*

Imagecure.com, HTML Image Splitter—Speed Up Loading of Huge Images (Web Design Tools), Mar. 18, 2006, http://web.archive.org/web/20060318012043/http://www.imagecure.com/imgsplit.html.*

Imagecure.com, Image Mapping and Image Slicing Utilities (about image slicing), Mar. 18, 2006, http://web.archive.org/web/20060318012043/http://www.imagecure.com/image_slicing.html.*

Imagecure.com, Image Mapping and Image Slicing Utilities (about image maps), Mar. 18, 2006, http://web.archive.org/web/20060318012043/http://www.imagecure.com/image_maps.html.*

Guangming Software, "HTML Snapshot ActiveX Component", Oct. 9, 2006 Guangming Software, pp. 4.*

* cited by examiner

METHOD AND SYSTEM TO SECURE THE DISPLAY OF ADVERTISEMENTS ON WEB BROWSERS

FIELD OF THE INVENTION

The present invention relates generally to data processing, and more particularly to systems and methods for web browsing.

BACKGROUND ART

The business model of many companies on the Internet mostly depends on the display of advertisements on a client web browser. The rise of solutions enabling the blocking or skipping of such ads greatly endangers this mainstream source of revenue.

Advertisements represent a major source of revenue for many websites and companies. In the case where ads are massively rejected (and even "well targeted", effective or informative ads of major companies), there won't be free content or services anymore. For now, only the most technically proficient users are aware of such adblocking techniques but a default integration of such tools in mass-market web browsers would result in huge losses for companies whose business model rely on advertisement. It is then of the highest importance to be able to find a way to secure the display of advertisements on web browsers and to avoid the possible death of advertising in today's digital networks and their associated ever growing adblocking capabilities. Indeed, a complete shift away from advertising threatens, with the growing use of adblocking techniques (so called adblockers or ad blockers).

Advertisements are text areas, still images, animated images, or even videos embedded in web pages. When a member of the advertising audience (referred to as a "viewer" or "user" without loss of generality) selects one of these ads by clicking on it, embedded hypertext links typically direct the viewer to the advertiser's Web site ("click-through" process).

It appears that more and more consumers are tired of intrusive marketing. They are saturated by highly distracting ads, though some industry players try to leverage "non-annoying" and "informative" ads. Indeed, there are very few simple, easy to read, non-intrusive, text advertisements. Instead, ads are often flash or animated gif banners that users feel to be too invasive (pop-ups, pop-unders, and the like sometimes cover the desirable content) and flashing graphics make it very hard to read real text elsewhere on the page. Most of the time ads that are delivered are not appropriate (so-called targeted ads often fail), since they distract the reader with noise. Further, the targeting of users implies to track habits and threatens privacy.

For these and other reasons, more and more users use so-called adblockers (or ad blockers). From a users' point of view, adblocking benefits include cleaner looking web pages, lower resource-usage (bandwidth) and the loading of pages is said to be speeded-up (many pages are designed to load heavy ads first). The state of the art comprises many adblocking techniques enabling the skipping or removing of advertisements on web browsers, such as pure text browsers, pop-up blockers (or pop-under), blacklists of URLs of ad servers, text filtering tools (based on keywords, to prevent ad files from loading), script blockers, use of CSS rules (to hide specific HTML and XHTML elements), etc.

Adblocking techniques are not solely involved. The use of extraction techniques for building personalized web pages, the use of RSS, and the use of mashups also induce advertisements' skipping. The use of personalized web pages enables the extraction of precise content areas and the gathering of the extracted content in personalized pages. Following such extraction, the user does not need to visit the original page again, thus skipping advertisements if any.

Another technique relies on loading entire pages and displaying them only with frames and/or <DIV> tags, hiding unwanted content. This last possibility also presents the drawback to leave the number of unique visitors unchanged (from the advertiser's point of view), though content is not displayed to the user.

With RSS feeds (RSS stands for "Really Simple Syndication"), similar mechanisms do operate. Indeed, the rise of RSS feeds has deeply changed the nature of the Internet, which isn't anymore a stock of data but flows of data. It is important to notice that according to this RSS model, content providers do control feeds, meaning they can choose what content to offer to theirs subscribers, through RSS feeds. Again, thanks to emerging mechanisms, it is now possible for users to freely extract parts of web content, without any limitations. In other words, web users do not need to visit bottleneck pages anymore (home pages or portals containing lots of ads). In this context, content providers may be reduced to providers of raw data, with very few choices for monetizing their business. For example, a technique (sometimes called RSS Generator) enables the extraction of feeds from any web page. Yet other techniques allow not only the gathering of RSS feeds, but also the combining of feeds (RSS Remixer tools enable filtering, searching, mixing, etc). There have been some attempts to embed targeted ads into syndicated feeds (an ad would be served in an RSS item or blog post containing keywords that an advertiser has pre-selected) but text filtering (keywords-based—or involving other techniques) can bring this to defeat too. At last, the use of so-called mashups also poses a threat to online advertising. Thanks to APIs (Application Programming Interfaces), applications themselves can also be aggregated. And in particular, advertisements can be removed during the remixing of contents.

On the reverse side (i.e., secure display of advertisements), it appears that there are very few technical solutions available. A known approach consists in URL address scrambling techniques, in order to bypass URL blacklists. This solution is not efficient because of the reactivity of possible collaborative filtering (like peer-based anti-spam techniques). The use of randomized addresses also induces limitations (learning capabilities). Aside from this common technical approach, there are only non-technical methods. For example, permission marketing methods are tested (indeed, users may target ads instead of ads targeting users), but these methods do not apply well to mass markets. Other methods based on user profiling have been tried by advertisers or their partners to deliver better perceived forms of advertisements, but it poses privacy threats.

If no reliable solution emerges to secure the display of advertisements, advertising formats may evolve to these contextual, interactive, permission-based and targeted messaging to retain consumer's attention and to help minimize both irritation and "tuning out." A few content or service providers also try to warn their users on damages implied by the use of adblocking techniques by arguing that it takes revenue out of the people that work hard to provide them content and services. Sometimes they require a specific license agreement for visiting their websites. In conclusion, none of these (non-technical) methods succeed to effectively act as countermeasures to adblocking techniques and/or the use of RSS feeds and/or the use of personalized web pages, and in fine, to secure revenues streams.

SUMMARY OF THE INVENTION

A method and system to secure the display of advertisements on web browsers is disclosed. Included are processes and tools for interpreting a markup file in a virtual machine, converting displayable elements of the markup file to one or a plurality of images and constructing a modified markup file comprising said at least one image file and a scripting language code adapted to cause a user terminal upon which it is executed to transmit coordinate information defining the position of a user-controlled cursor and action information defining a clicking action.

Among many advantages, the present invention defeats any image recognition technologies and defeats any semantic or text analysis, which technologies could possibly be used to block or skip advertisements, while providing an absolute protection against malicious software.

Indeed, one advantage of the present invention lies in its ability to secure the display of advertisements, because it defeats semantics technologies (ineffective on images) and exploits image recognition technologies' limitations (advertisements enclosed in larger images are not detectable). Further, advertisements are not solely involved: the present invention addresses every situation wherein a particular area (such as text or graphics) needs to be secured (need for preserving the integrity of displayed data). This will be further discussed below.

An indirect benefit of the present invention lies in its ability avoid any execution of malicious code (if any) both for the proxy server and the web browser. The Internet today is infested with dangers, among which is malicious software code. A user visiting a web page with a web browser can inadvertently execute malicious code, endangering the user's local machine (immediately or in the near future). The generic malicious code comprises viruses, Trojans later downloading and installing keyloggers, spyware, etc. Private and financial data are then at risk, and the hardware device can also be physically damaged, if not remotely used for illegal purposes. It is then very valuable to be able to safely browse the Internet. Indeed, the two-tier architecture provided by the present invention enables malicious code execution to be avoided on the browser side (the web browser does not receive markup pages with unreliable code, but only very simple markup scripting language and images), while the use of virtual machines secures the proxy (the virtual machine is disconnected from the host machine; for example, dynamic links libraries or dll cannot be modified, virtual machine act like so-called sandboxes).

Quite surprisingly, malware and advertising are tied: malicious code is said to be massively injected through online advertising, due to the complex structure of business relationships (injection of malicious content into legitimate advertising delivery streams). The present invention secures the display of advertisements and at the same time avoids malicious code execution. The web browser has the guarantee not to execute any malicious code while the content provider has the guarantee to secure its advertisements. It is a win-win operation that opens many interesting business opportunities.

Another advantage is that it only requires a standard browser. It does not require any additional plug-ins, components, or local software on the client side. No additional software is required on top of the web browser. The present disclosure is thus the first approach that works without browser modifications (use of unmodified browsers). It can be used directly in today's browsers, hence adoption can be immediate.

Yet another advantage is that the present invention enables fast and low cost Internet access. It reduces the weight and complexity of an incoming markup file for the web browser (it reduces possible bugs or errors contained in code elements). Today, a lot of devices (mobile phones, tablet PCs, etc.) have limited CPU capacities. Because modified markup files only contain image files (in addition to scripting language code which is not malicious), browsers or viewers running on the devices almost only need to be able to display images. It thus enables remote browsing for mobile devices with limited computing and memory resources.

Further advantages of the present invention will become clear to the skilled person upon examination of the drawings and detailed description. It is intended that any additional advantages be incorporated therein.

BRIEF DESCRIPTION OF THE DRAWINGS

Embodiments of the present invention will now be described with reference to the following drawings.

DETAILED DESCRIPTION OF THE INVENTION

To facilitate description, any numeral identifying an element in one figure will represent the same element in any other figure.

Figure 1:
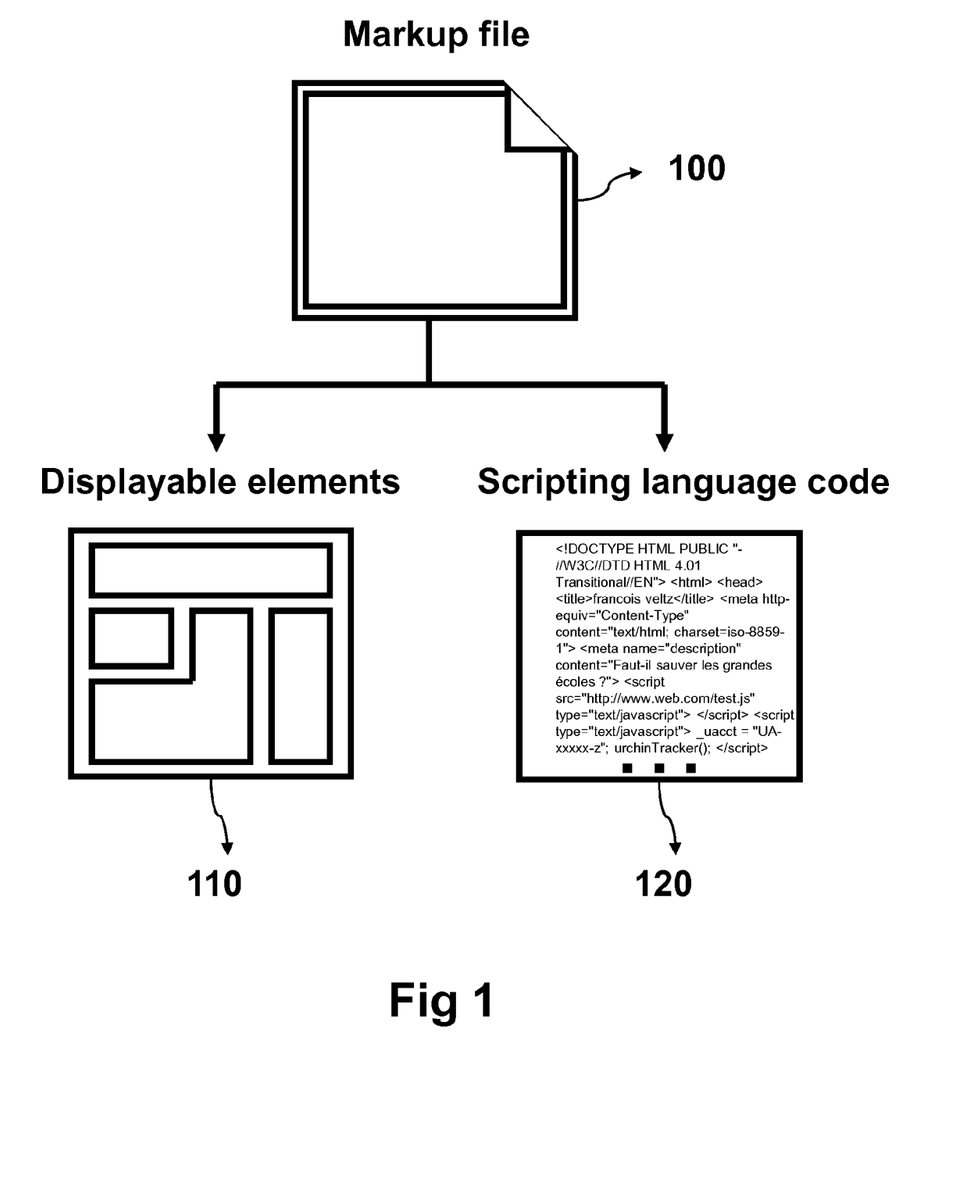
FIG. 1 shows the displayable elements and the scripting language code of a markup file.

FIG. 1 shows the displayable elements and the scripting language code of a markup file, and the object that will be modified and used according to the present disclosure.

FIG. 1 shows a markup file (100) which comprises a set of displayable elements (110) and a scripting language code (120).

The markup file (100) is usually a binary file, but it can exist in a formatted nature. It is usually transmitted over networks and/or retrieved locally in memory; it may be generated locally, entirely or in parts. In an embodiment, the markup file (100) is an HTML file. Web pages indeed include (displayable) content, and instructions or embedded information (such as meta information, hyperlinks addresses, scripts, etc.).

According to certain embodiments, the determination of displayable elements (110) can be considered relative or absolute. The determination is said to be relative when resulting from the interpretation by a viewer. For example, a set of displayable elements of an HTML markup file will be determined by loading and interpreting the markup file in a web browser (or web browser instance). It is observed that different web browsers may lead to different interpretations (and thus different set of displayable elements), although there is a convergence between the different interpretations performed by web browsers existing on the market. In this sense, the interpretation is considered relative. Another approach would integrate the different behaviors of web browsers into a common rendering model (absolute interpretation). In brief, these displayable elements are all elements that will reach the user's eyes or that are useful to this final display. Displayable elements (110) thus can be elements, such as images, videos areas, and text areas. The "displayable elements" expression is intended to cover elements that will be seen by the user in the end. Consequently, it covers cases including possible further operations (such as filtering or masking) that may happen after the operations performed in accordance with the present invention.

According to an embodiment, regarding the scripting language code (120), it is observed that the expression "scripting language code" designates all instructions or lines of software code comprised in the markup file (100). In detail, it comprises all suites of characters forming instructions understandable by the machine by/for interpreting the markup file. In other words, it comprises all data that is not intended to be directly seen by the final user or viewer of the markup file (such as scripts or meta data for example). In addition, it also comprises all data that is indirectly useful for the display of displayable elements (for example <DIV> HTML tags). The scripting language code (120) is often enclosed in the markup file (or can be associated with it and further retrieved). Code elements are usually enclosed in the markup file, but not always. Indeed, modern programming techniques may use the dynamic retrieval of code programs. Consequently, in some situations, it may be necessary to retrieve pieces of code elements, dynamically associated with the set of code elements originally enclosed the markup file. For example a user action in the browser may imply a further modification of the markup file (by retrieving new instructions from the server, or by accessing local resources. For example through "Xinclude" which defines the ability for XML files to include all or part of an external file). For this reason, initially, the markup file interpreted.

Figure 2:
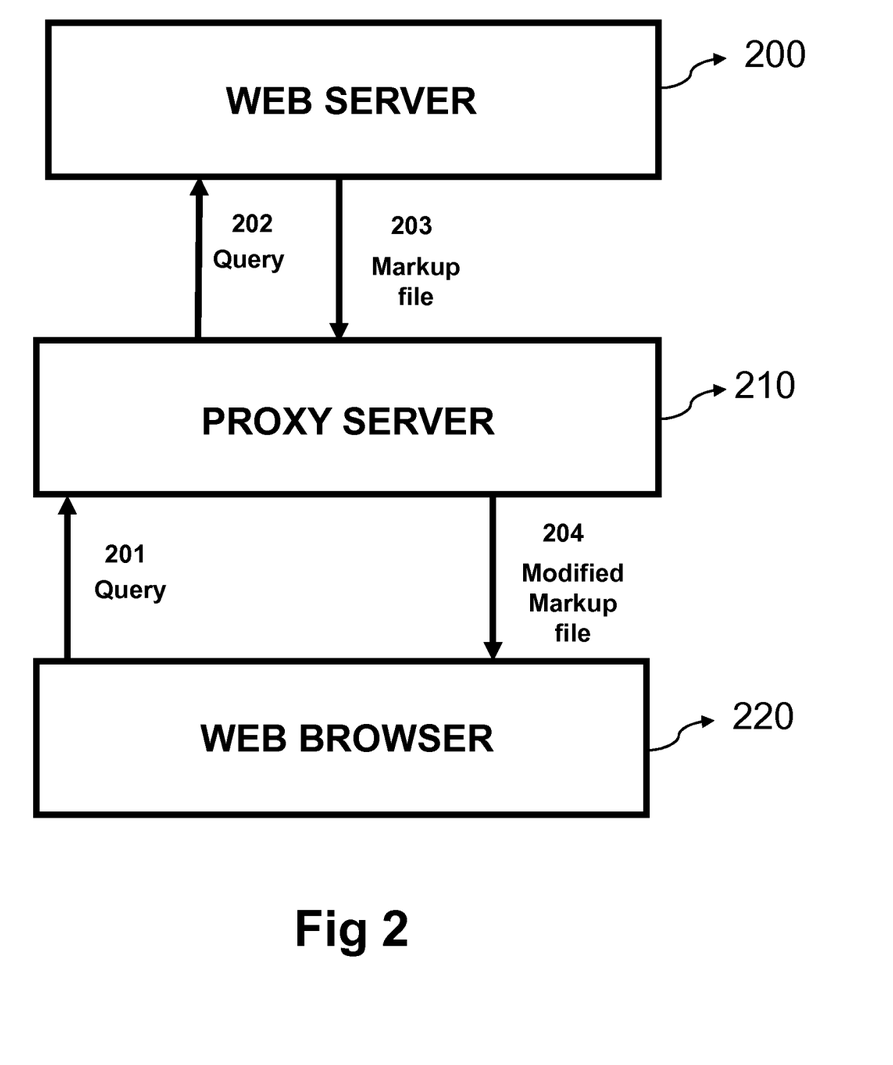
FIG. 2 shows the general principle of the invention.

Reference is now made to FIG. 2, which shows the general principle of the invention.

According to a certain embodiment, the figure shows a web server (200), a proxy server (210) and a web browser (220).

The figure shows an example, in which the query of the web browser (230) is received (or intercepted, see FIG. 7) at step (201) by the proxy server (210) The proxy server (210) transmits through a network (not shown) the query to the web server (200) at step (202). In response to the query (202), the web server transmits through a network (not shown) a markup file at step (203). The proxy receives the markup file and operates a series of operations with the markup file (which will be described in the following figures) and finally transmits at step (204) through a network (not shown) a modified markup file to the browser (220). The web browser (220) interprets the modified markup file.

FIG. 2 is only provided as an example. Many options and alternatives will be further discussed. In particular, there can be one or a plurality of networks involved, which can change over time and can be of different nature (RTC, ADSL, Fiber, T1, Wimax, UMTS, Wifi, etc.), using different protocols.

Figure 3:
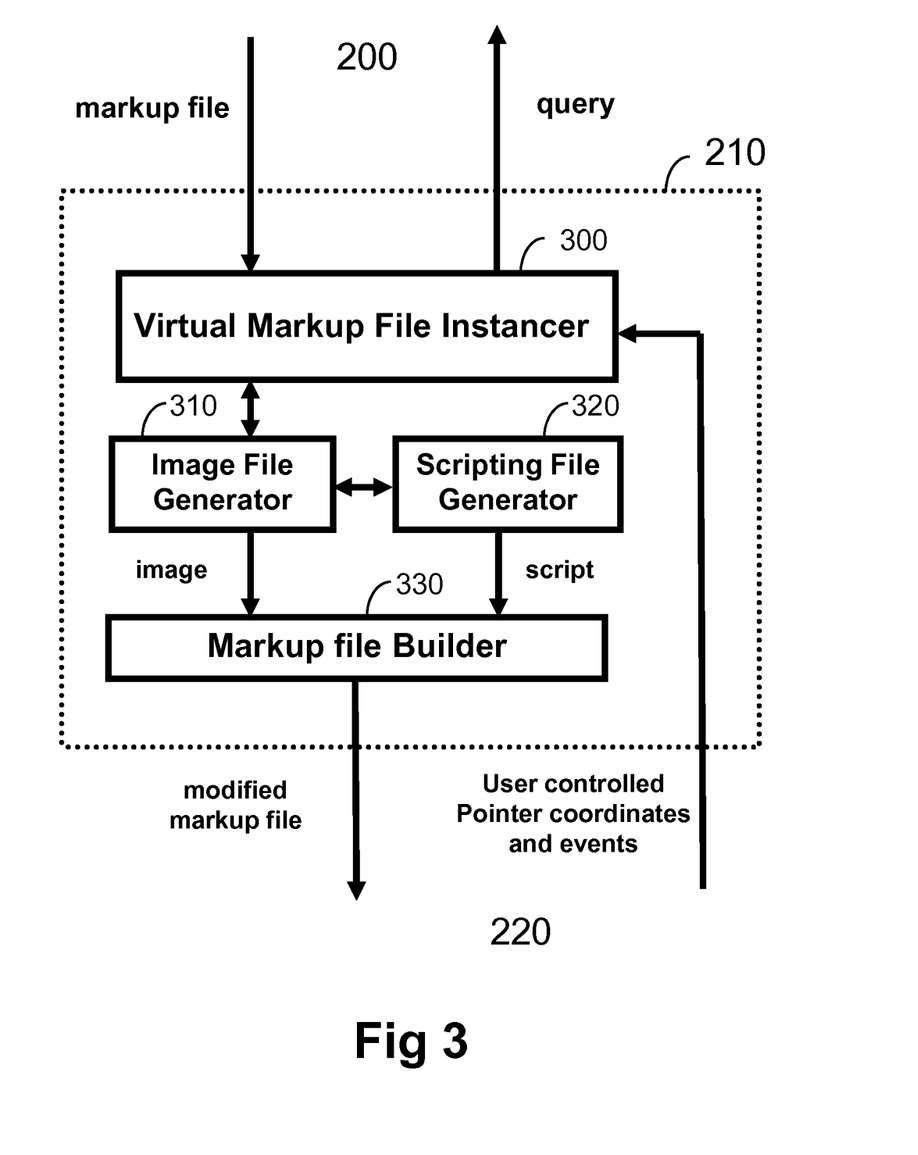
FIG. 3 shows operations on the proxy server.

FIG. 3 shows operations on the proxy server (210). According to an embodiment, FIG. 3 shows a Virtual Markup File Instancer (300), an Image File Generator (310), a Scripting File Generator (320) and a Markup File Builder (330).

According to the present invention, a markup file served by the web server (200) is received by the Virtual Markup File Instancer (300). This component will be described in detail in a further figure. The Virtual Markup File Instancer (300) interacts with the Image File Generator (310), which renders one or a plurality of images (sub-images) from the displayable elements (110) of the received markup file, interpreted in the Virtual Markup File Instancer (300). The Image File Generator (310) interacts with the Scripting File Generator (320) which outputs a new scripting language code. The scripting language code is adapted to cause a user terminal upon which it is executed to transmit coordinate information defining the position of a user-controlled cursor. In addition, the scripting language code can be further adapted to cause a user terminal upon which it is executed to transmit action information defining a clicking action of a user-controlled cursor. The scripting language code also encodes the relative positions of images having been generated (if a plurality of images has been rendered).

According to an embodiment, the Markup File Builder (330) then builds a modified markup file with the new scripting language code of the Scripting File Generator (320) and the image(s) being generated by the Image File Generator (310). The modified markup file is then received and interpreted by the web browser (220). In response to the user's pointer actions, the Virtual Markup File Instancer (300) duplicates the user's action. In other words, the Virtual Markup File Instancer (300) simulates the user-controlled action (click) at given coordinates in the corresponding browsing instance or session (see FIG. 4). Finally, the Virtual Markup File Instancer (300) queries the web server (200), and the process continues accordingly for interactively browsing the Internet.

While the original markup file (203) served by the web server (200) contains a set of displayable elements (110) and an original scripting language code (120), the modified markup file (204), outputted by the proxy server (210), contains one or a plurality of images generated by the Image File Generator (310) and a new (and light) scripting language code generated by the Scripting File Generator (320).

Regarding the scripting language code generated by the Scripting File Generator (320), it is further observed that it can be adapted to cause a user terminal upon which it is executed to transmit the coordinate information continuously (for prefetching purposes, i.e., anticipating the request of markup files referred to in links present in the markup file to accelerate response time) or on a periodic basis (via refresh mechanisms). It may be recalled that relative positions of image files having been generated constitute part of the scripting language code generated by the Scripting File Generator (320). According to certain embodiments, the information related to the cursor coordinates and/or actions (clicks) can be relative to any one of the generated images or defined with absolute coordinates in the modified markup file. According to other embodiments, the scripting language code generated by the Scripting File Generator (320) can be further adapted to transmit coordinates and clicks for a only subset of images generated by the Image File Generator (310) or even for a subarea of one single image (sub-image). In other words, the user interactivity can be maintained possible for some areas and can be forbidden (not existing) for other specific areas. This variation is very valuable because of the control it offers over the user interactivity.

Figure 6:
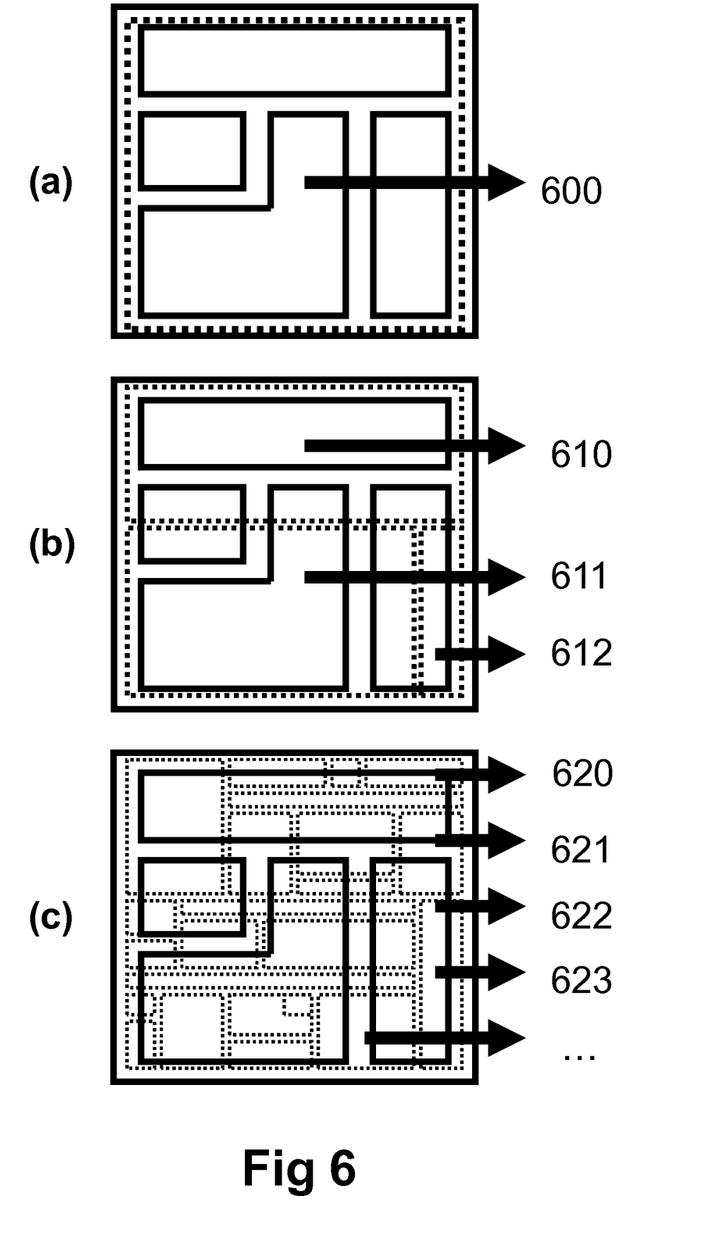
FIG. 6 illustrates the various sub-images generation modes.

As per the generation of images, as further described with regard to FIG. 6, there is disclosed a type of mirroring between the instance running in the web browser and the instance running in the Virtual Markup File Instancer (300), according to an embodiment. Such a mirroring enables further possibilities. In the case where the markup file is an HTTP markup file, when an HTML request is performed, information about the browser itself is transmitted (type, colors, resolution, etc.). Usually, this sort of fingerprint is transmitted once, but this information can be retrieved on a regular basis. With script code, it is thus possible to analyze the resolution of the page and to accordingly render the image files (by resizing the image(s)). The images generated by the present invention can be of the same size than those of the displayable elements of the original markup file, and they can be larger or smaller, depending of the display area of targeted viewer or browser. In the case where image files are larger than the display area of the targeted viewer or browser, the targeted viewer or browser will use standard scrolling options to display the complete image of the original markup file. According to other embodiments, the use of cookies can be valuable to store user-controlled coordinates, store information about the web browser (type, colors, resolution, etc.), setup auto-refresh mechanisms, etc.

Depending on web browsers, the image rendering of displayable elements of markup files can be slightly different. In principle, HTML is a standard and then the rendering of the final HTML page is consistent among browsers available in the market. But in practice, there may be differences between the different renderings performed by different web browsers. The disclosed operations can be directed to take into account these differences.

In conclusion, according to an embodiment, there is disclosed a method of handling an interpreted markup file, receiving a markup file, and interpreting the markup file in a virtual machine (the markup file comprising a set of displayable elements), and converting the set of displayable elements of the markup file interpreted in the virtual machine to an image.

Figure 4:
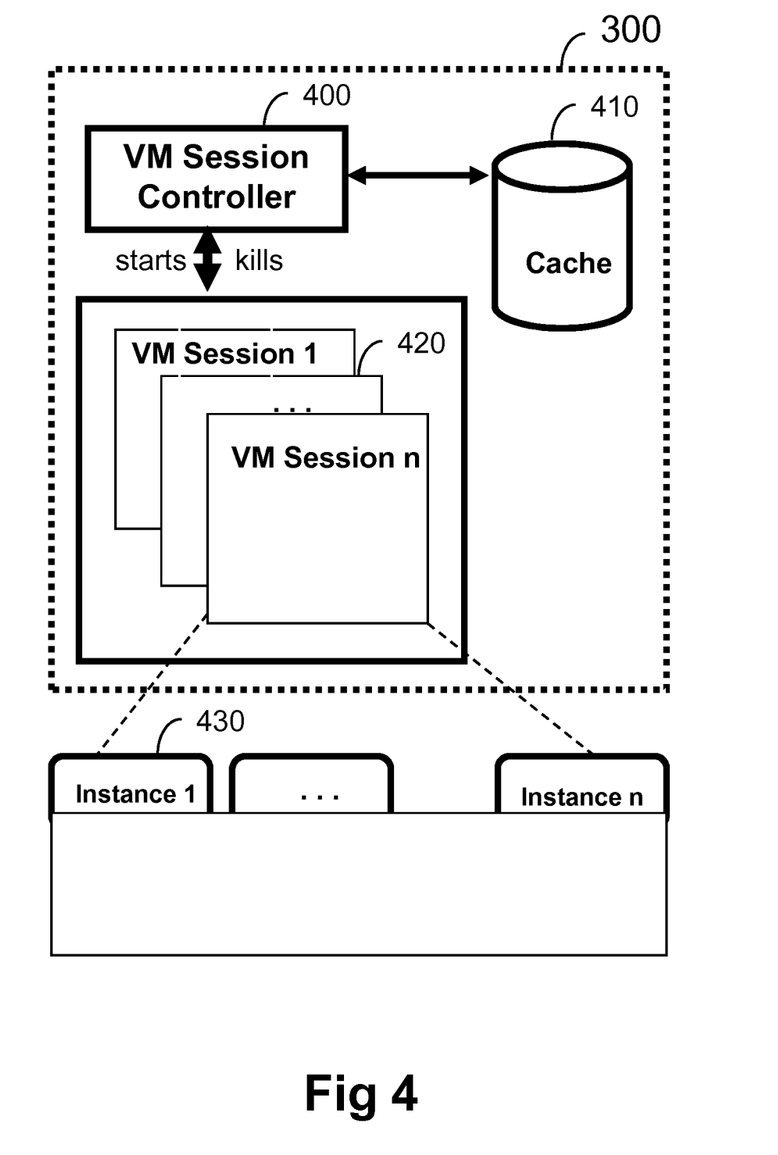
FIG. 4 details the use of a virtualization mechanism.

Reference is now made to FIG. 4. According to an embodiment, the FIG. 4 details the use of a virtualization mechanism, and shows details of the Virtual Markup File Instancer (300). The Virtual Markup File Instancer (300) comprises a VM Session Controller (400), a cache memory (410) and one or a plurality of virtual machines, each running a VM browsing session (420), each browsing session (420) running a plurality of browsing instances (430).

According to An embodiment, the VM Session Controller (400) receives one or a plurality of markup files. It accesses a cache memory (410) to improve response time (the memory cache stores markup files, modified or not). The VM Session Controller (400) controls the pool of virtual machines (420), i.e., it can start or kill a browsing session (420). Each browsing session (420) runs one or a plurality of browsing instances (430). A browsing instance (430) interprets received markup files. When the markup file is an HTML file, a browsing instance (430) is a tab.

The use of such an optional Virtual Markup File Instancer (300) enables a safe web browsing method that is valuable for both the proxy server (210) and the served web browser (220). For the proxy server (210), using such a virtualization mechanism presents tremendous advantages. For example, if a virtual machine (420) is corrupted or attacked, and fails, it can be started again without prejudice. Indeed, if the proxy server (210) does not make use of virtual machines (but only runs one or a plurality of simple browsing instances (430) for example), the crash of even a single browsing instance (430) can make the proxy server crash. To the contrary, with such a virtualization mechanism, several scenarios may occur. For example, supposing that the proxy server (210) is running n VM browsing sessions (420), each VM browsing session (420) running n browsing instances (430). If the proxy server (210) itself crashes, all VM browsing sessions (420) and their associated browsing instances (430) go down. If a VM browsing session (420) gets down, its associated n browsing instances (430) go down (but the remaining n−1 VM browsing session (420) remain up and running and (n−1)×n browsing instances (430) keep going). If a browsing instance (430) goes down, it might compromise its n−1 associated browsing instances (430), but (n−1)×n browsing instances (430) will still be up and running.

It is possible to dedicate one or a plurality of virtual machines to a dedicated user or a group of users, enforcing the robustness of the system.

Figure 5:
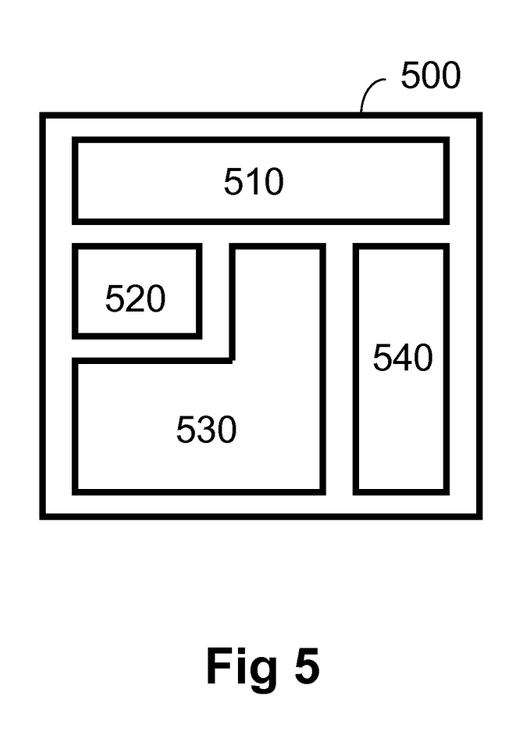
FIG. 5 illustrates an example of displayable elements of a markup file.

Reference is now made to FIG. 5, which shows an example of displayable elements of a markup file.

In the proposed example, the markup file (100 or 203) comprises many distinct displayable elements (110), such as a horizontal advertisement banner (510), a right column for a menu comprising URL links (540), a video object area (520) and a text area (530).

Reference is now made to FIG. 6. According to an embodiment, FIG. 6 illustrates various sub-images generation modes. Indeed, displayable elements of a markup file can be converted into one (FIG. 6a) or a plurality of images, i.e., sub-images (FIG. 6b and FIG. 6c) in many ways.

In an embodiment, generating a single image (FIG. 6a) is sufficient to secure the display of advertisements while being fast and easy to achieve. According to other embodiments, a plurality of images (sub-images) is generated. This is not mandatory, it only reinforces the robustness of the method and system. It is also observed that any similar image generation, modification or combination, is included in the scope of the present disclosure.

As shown in FIG. 3, the Image File Generator renders one or a plurality of sub-images from the displayable elements (110) of a received markup file (203).

FIG. 6a illustrates the case wherein a unique image (600) is generated (represented in dotted line), according to an embodiment. The single image (600) represents the totality of the displayable elements (110) of the markup file, and may be considered as a "background" image. This image captures what is what is displayed to the user. This can be achieved using several techniques, for example by accessing the video buffer (most of the time, the operating system itself does provide such a feature).

FIG. 6b, according to other embodiments, illustrates the case wherein the displayable elements are converted into a plurality of sub-images (610,611,612), eventually in a disposition which does not correspond to (or duplicates) the original arrangement of displayable elements. For example, the sub-image (610) comprises pixels of many distinct displayable elements (110): pixels of the horizontal advertisement banner (510), pixels of the right menu (540), pixels of the video object area (520) and pixels of the text area (530). This greatly secures the display of the advertisement banner (610) (image recognition becomes more difficult; please see further explanations). Such an "image mapping" can be easily obtained from the image (600).

FIG. 6c illustrates a further embodiment wherein the displayable elements are converted into a large high number of sub-images (620, 621, 622, 623, . . . ), eventually involving random (ever-changing and complex mapping), and be they adjacent or superposing images. Overlap between sub-images indeed remain possible and even wishful.

The image (600) or any of the generated sub-image (610, 611, 620, 621, 622, . . . ) can be further modified or altered by operations such as convolution operations, morphological operations, geometric operations, histogram operations, alpha compositing operations, etc. It is an advantage of the present invention to defeat text analysis tools (semantics, OCR, etc.) as well as image recognition tools (pattern matching, edge points, etc.). For example, each generated image or sub-image can be cropped, blurred, encoded in a rare format, transformed into a black and white image, distorted, etc.

Noise can also be added to the image or sub-image. It is noted that the described operations (such as divisioning, splitting, partitioning, gathering, grouping, distorting, noising, discretizing, resampling, scrambling, greyscaling, etc.) on the image or sub-images derived from the displayable elements of the markup file can be combined in many ways, the operations aiming at enforcing the robustness of the proposed mechanism against possible adblocking techniques. For example, the above operations can be applied to the totality of displayable elements or only selectively to a subset of these displayable elements. Yet, a compromise has to be found between readability for the final user and greater difficulty to analyze and block the resulting image and/or sub-images. Readability scoring systems can help to perform these operations.

Certain advantages of such a generation of images are detailed below. One advantage of such an image generation process is that it allows the display of advertisements enclosed in markup files to be secured. Indeed, it defeats all techniques used by so-called adblockers, among which text analysis techniques and image recognition techniques. Because displayable elements containing text have been rendered into an image, no semantic or text filtering tools will be later able to perform any analysis. The comprehensible data for these tools has been simply erased. Still, one might try to perform an OCR analysis (analyzing the image to extract enclosed text), but these tools are very sensitive the quality of the image and do consume a lot of computing resource. An adapted image modification will easily defeat this possibility (by adding noise or by distorting slightly the image, seeking for a compromise between readability for the user and added complexity for OCR or other analysis tools). As per image recognition technologies, they are at very early stage. One might try to isolate image areas from texts areas, and then apply image matching techniques (i.e., comparing isolated images with databases of known advertisement images, to decide whether the isolated images are advertisement images or not). It appears that it is difficult, if not impossible, to detect an advertisement image enclosed in another larger image. The more the surface of the advertisement image is small compared to the total surface, the more image recognition (or matching) performs badly. An advertisement enclosed in a 110% image would be more easily detected and recognized than an ad enclosed in a 400% image (recognition dramatically falls at the threshold 25% in average). Even advanced image recognition technologies, such as the so called pattern matching technique (aiming at automatically isolating objects of interest within an image by using edge point detection and other techniques) also fail in practice. Similar to the use of text analysis techniques, these image recognition technologies are too CPU and memory intensive and thus fail to provide a good solution in real-time or intensive environments. The same analysis can be conducted to product placement in movies (detecting and deleting a brand apparition in a movie will remain impossible for many years)

In FIGS. 6a and 6b, one advantage stems from the difficulty to isolate homogeneous areas and consequently to perform efficient image recognition techniques. In FIG. 6c, one advantage stems from the difficulty of gathering adequately images to perform image recognition techniques and text/Optical Character Recognition analysis.

Rendering displayable elements into one or a plurality of images thus introduces many advantages. Depending on an adequate intelligent mapping, the robustness of the system to adblocking techniques can be optimized and the display of advertisement can be greatly secured. Given one or a plurality of areas to be secured, one or another image generation mode will be chosen. In other words, knowing the area where the advertisement is placed (according to data provided by the advertiser for example), it is then possible to optimize the image mapping so that image recognition techniques present the lowest possible performance. Such a feature allows interesting business models, since advertisers can pay for additional services (precisely for securing the display of their specific advertisements, for example). It also enables the prioritization of the display of image files (transmitting images in a sequence according to a display priority). For example, the generated image file containing the advertisement could be displayed first (such a feature can be useful when considering bandwidth parameters, etc.).

In conclusion, there is provided a further technique of altering one or a plurality of images by distorting, greyscaling, re-encoding, resizing, noising, discretizing, resampling or scrambling. It is advantageous when combined with the described virtualization mechanism.

Figure 7:
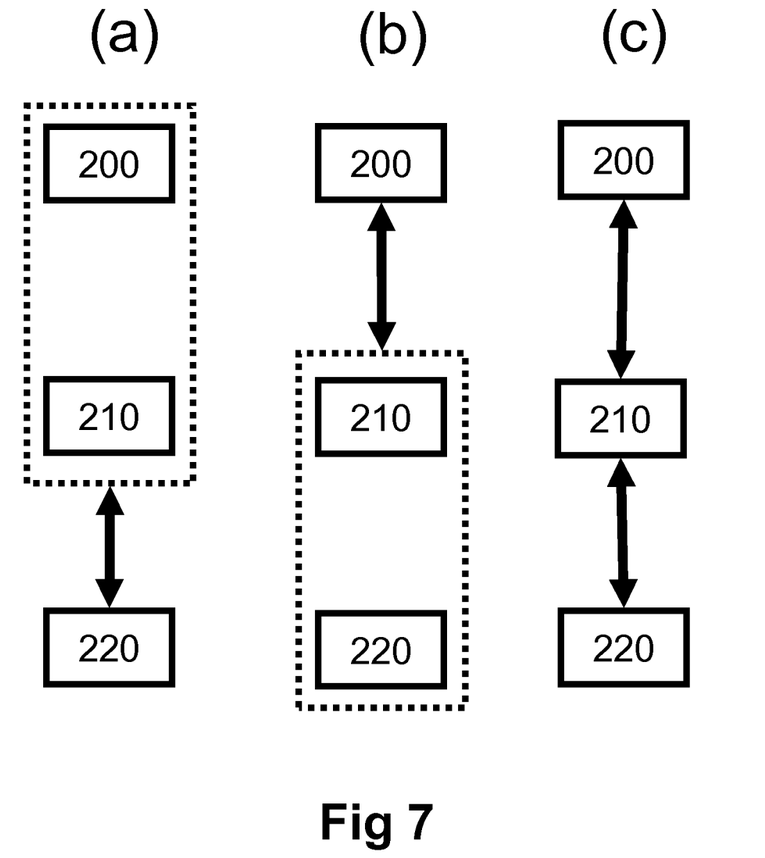
FIG. 7 illustrates architecture options.

Reference is now made to FIG. 7, which considers architecture options and alternatives.

The present disclosure describes a two-tier architecture, wherein the proxy server performs steps of the present invention (image generation and virtualization). However, the implementation of the proposed mechanisms can be made according to many more possibilities that will be further discussed.

Introductory considerations about proxy and the economy of browsers are required. Browsers can be broadly understood as "viewers". A browser is designed to render markup files into displayable elements for the user and to execute code elements. Indeed, web browsers are software programs installed on desktop computers or mobile devices and adapted to execute script programs, parse, and display web pages. From technical and legal points of view, some web browsers are open source and others are proprietary. This distinction between open source and proprietary is important, because proprietary software enables to control software code developments, which is not the case with open source software. For example, proprietary media players can forbid fast-forward, thus forcing users to watch video advertisements (in general located at the beginning of video files). With open source software (i.e., accessible and modifiable software code), this is not possible anymore, since software code can be changed to enable advertisement skipping. More generally, this is true for any DRM (Digital Management Right) system, which necessarily requires at least a portion of closed software code (protection by secret as opposed to open source code which is available to anyone). In theory, proprietary browsers would be capable of selectively enabling advertisement blocking (no specific add-on available, etc.). The case of open source web browsers is more simple, since forks can emerge anytime, allowing such specific add-ons. Another important aspect of advertising blocking economy is business interests. A well known open source browser is largely funded by a major advertising company (and thus has little incentive and interest in enabling a default integration of ad blockers in its browser). However, forks (modified distributions of the open source browser) could emerge anytime. Proprietary web browsers could possibly selectively enable some advertisements and disable others, according to their own interests or agreements. For example, it might be technically possible for providers of proprietary web browsers to block other provider's advertisements and to allow only those of its own platform. For all these reasons, the use of a proxy server performing steps of the present invention is very valuable (but not mandatory).

FIG. 7 shows a web server (200), a proxy server (210) and a web browser (220), in various configurations. Logically, the proxy server (210) is located between the web server (200) and the web browser. Physically, the proxy server (210) and the web browser (200) can be running on the same physical machine as shown for example on FIG. 7a. However, using a virtual machine on the local machine running the web browser (220) itself is not always possible and FIG. 7b shows a situation wherein the proxy server (210) and the web server (200) run on the same physical machine. FIG. 7c shows the last situation wherein the web server (200), the proxy server (210) and the web browser (220) run on three different physical machines.

Since a proxy is usually hardware-implemented, it can also be software-implemented. Consequently, steps of the present invention can be implemented partly in the web browser (220), partly in the proxy server (210), partly in the web server (200) (or a combination).

According to certain embodiments, since the proxy server will see all queries of the web server (account numbers, passwords and visited pages of the web browser will be transmitted to the proxy server through the web browser queries), it is highly recommended that the proxy be run by a trusted party (unless anonymization mechanisms are used). Authentication mechanisms may be used (ranging from a strong authentication to a simple registration; hash values may be used for the delivery of image files).

Below, it will be assumed that all operations of the present invention are performed by the proxy server (210).

FIG. 7a is anticipated to be a simple and easy implementation, because of agreements between administrators of the web server (content provider) and advertisers. In an embodiment, the web browser has nothing to tell about this mode of implementation (operations performed will be transparent, i.e., the browser will only receive modified markup files, while queries will be easily intercepted by the proxy server). One advantage of such configuration is that the web browser has the guarantee not to execute any malicious code while the content provider has the guarantee to secure its advertisements. It is a win-win operation that opens many interesting business opportunities.

FIG. 7b illustrates a further possibility, according to an embodiment. The program implementing the present invention can be executing in a higher level than the web browser (operating system for example). Or, it can be implemented in the form of a plug-in or add-on. The execution or presence of such a program may even be required by the web server for example (non compliant browsers wouldn't be served, for example). The browser may agree to the presence of described steps, or not. For example, the presence and execution of such a program (trough a marketed "ad secure/safe browsing" browser add-on) may be required by the advertiser in order to allow the delivery of web pages (in this case, the user of the browser may agree to the installation of such an add-on for example). According to certain embodiments, it may also be implemented in a form of malware, which will execute the steps without the consent of the user of the browser. According to other embodiments, it may also correspond to the implementation of the present invention in a proprietary browser (over which the user has little if no control).

FIG. 7c illustrates more complex cases, since the proxy server may act as a malware for example (man-in-the middle attack, for securing the display of advertisements, eventually against the willingness of the browser, or without its consent). According to certain embodiments, this also illustrates a possible mutualisation of proxy servers through the network, or the proxy acting as an on-demand resource for the web server and offering reliable access to Internet for the web browser.

Various embodiments of the present invention can be seen as being a synergy between technologies not related at first sight: a technique of generation of images and a virtualization mechanism. In other words, the present invention combines a virtualization mechanism in addition to an image generation processing mechanism.

According to an embodiment, there is provided a system to secure the display of advertisements. The system involves a web server, a proxy server and a client browser. In response to a first client browser query, the proxy server requests the corresponding markup file from the web server. Upon reception of the markup file, the proxy server interprets the markup file in a virtual machine and transforms the markup file into a graphical image. The proxy server then constructs a modified markup file containing the graphical image and light reengineered scripting language code, adapted to transmit coordinate information defining the position of a user-controlled cursor and action information (such as a click) of the user-controlled cursor. In the end, the client web browser displays and interprets the modified markup file.

According to a another embodiment, there is disclosed a method to view internet content, an image being rendered at a remote proxy server from the entire webpage which the remote proxy server retrieves from the Internet in response to the request, the web page containing text and graphics.

According to certain embodiments there is disclosed a robust proxy internet browsing method according to which the virtualized proxy server sends image data representing the site to be browsed to a standard web browser on the users machine for display, and captures mouse commands, etc., using a script running on the browser.

In an embodiment, a markup file comprises an HTML (hyper-text markup language) or PHP page, but it is observed that much wider cases may be envisaged. Indeed, the disclosure equally applies to other environments than the World Wide Web. It is thus intended that the scope of the invention covers all forms of electronic communications.

The disclosed technique applies to any kind of markup file, whatever is the environment. For example, the technique applies to WML pages, in mobile/wireless environments. The invention covers all known markup languages, such as XHTML (well-formed XML), DocBook, MathML, SVG, Open eBook, TEI, XBA, SGML, XML as well as other systems explicitly designed to support descriptive markup languages. It is observed that most browsers natively support a variety of formats in addition to HTML, and can be extended to support more through the use of plug-in. Similarly the disclosure can be applied to many technologies including current web interface developments: to web pages comprising applets and the like which can be executed on web pages thanks to a virtual machine; to web pages comprising RIA (Rich Internet Applications); and to web interfaces which now use RDA (Rich Desktop Applications) requiring a virtual machine.

According to certain embodiments, the described approach is not restricted to pure web environments; for example electronic messaging can implement embodiments of the invention (email clients do receive a lot of advertisements, whose effective display is intended to be secured by senders). Emails (electronic messages), since they can be in HTML format, are then also covered. According to other embodiments, the disclosure also applies to application suites rather than merely web browsers: applications also can embed advertisements. For example, advertisements can be embedded in .pdf viewers (pdf is a de facto standard and advertisements can be adapted to the final user according to the context and contents of the pdf file, among other parameters). According to the paradigm SaaS/Software as a Service, software is delivered through the Internet and any software application can appear as markup files (HTML pages). Similarly, gaming environments are more and more provided with embedded advertisements. Adblocking techniques could emerge in these environments and the present disclosure would enable to secure the display of advertisements. According to certain embodiments, the present disclosure indeed addresses all viewers (content from a document may be rendered on a "content rendering application or device". Examples of content rendering applications include an Internet browser, a media player (e.g., an MP3 player, a streaming audio file player, etc.), a viewer (e.g., a .pdf reader), etc.).

According to certain embodiments, the present disclosure is very valuable to secure so-called mashups. Mashups mix and merge contents (data and code) from multiple content providers in a user's browser, to provide high-value web applications. Web applications increasingly rely on extensive scripting on the client-side (browser) using a readily available client-side script libraries (and other programming paradigms). Mashup developers typically use a web application proxy server which fetches the content from different servers and serves it to the mashup or by directly including code from different origins. By separating and gathering contents, there are risks that enclosed or attached advertisements will be removed or skipped. Native security models of common browser platforms allow content to be separated, i.e., advertisements to be removed. By using the disclosed mechanism of image generation, it is possible to make content non-separable (encapsulating content), and following to secure the display of advertisements in these mashups environment, too. Associated with these image generation techniques, further code rewriting mechanisms can use script rewriting which can make a combination of static analysis and dynamic code rewriting (due to the self-modifying nature of some scripting languages), operations being performed in a rewriting proxy.

More generally, the described mechanism of scripting language code reengineering in addition to the generation of images applies to any situation where a distinction can be made between visualization and programming. Image mapping/generation will always be possible through analogue capture or video buffer access. Following, the present description discloses a technique that can be applied every time the underlying programming code can be accessed (since it enables to secure revenue stream, this will be more likely the common case). If code elements (underlying program and instructions) can be accessed (for example thanks to an API), then they can be modified (even in real-time) and the proposed mechanism can secure the display of advertisements. Even if the underlying program cannot be accessed, it can be learned, simulated, anticipated, computed, etc. Following, re-programming can also be reached (a step of learning has to be added to the present range of solutions).

The invention can take form of an entirely hardware embodiment, an entirely software embodiment or an embodiment containing both hardware and software elements. In an embodiment, the invention is implemented in software, which includes but is not limited to firmware, resident software, microcode, etc. In a high performance system, a hardware implementation of the virtualization mechanism bundled with image generation processing may prove advantageous for example.

Furthermore, the invention can take the form of a computer program product accessible from a computer-usable or computer-readable medium providing program code for use by or in connection with a computer or any instruction execution system. For the purposes of this description, a computer-usable or computer-readable can be any apparatus that can contain, store, communicate, or transport the program for use by or in connection with the instruction execution system, apparatus, or device.

While the invention has been particularly shown and described mainly with reference to various embodiments, it will be understood that various changes in form and detail may be made therein without departing from the spirit and scope of the invention.

The invention claimed is:

1. A method of securing a display of advertisements on web browsers while handling an interpreted markup file in an operating system of a computer device, the method comprising:
   receiving, in response to a request for a web page by a requestor, a markup file and interpreting the markup file in a virtual machine, the markup file comprising a first scripting language code and a set of displayable elements of the web page;
   converting the set of displayable elements of the markup file interpreted in the virtual machine to a modified markup file including a second scripting language code and the set of displayable elements in the form of at least one corresponding image; and
   serving the image to the requestor as the web page,
   wherein the web page served as the image includes an interactive function, which can be performed by the requestor, which mirrors an original interactive function that can be performed on the web page when not served as an image;
   wherein a decision to convert and serve the web page as an image is independent of any action by the requestor.

2. The method of claim 1, further comprising:
   altering the image by distorting, greyscaling, re-encoding, resizing, noising, discretizing, resampling or scrambling.

3. The method of claim 1, further comprising:
   dividing the image into a plurality of sub-images.

4. The method of claim 3, further comprising:
   altering one of the plurality of sub-images by distorting, greyscaling, re-encoding, resizing, noising, discretizing, resampling or scrambling.

5. The method of claim 3, further comprising:
   constructing a modified markup file containing the plurality of sub-images, wherein the second scripting language code is adapted to cause a user terminal upon which it is executed to transmit coordinate information defining a position of a user-controlled cursor.

6. The method of claim 5 wherein the second scripting language code is further adapted to cause a user terminal upon which it is executed to transmit the coordinate information continuously or on a periodic basis.

7. The method of claim 6, wherein the second scripting language code is further adapted to cause a user terminal upon which it is executed to transmit action information defining a clicking action of a user-controlled cursor.

8. The method of claim 1, further comprising:
   constructing a modified markup file containing the image, wherein the second scripting language code is adapted to cause a user terminal upon which it is executed to transmit coordinate information defining a position of a user-controlled cursor.

9. The method of claim 8, wherein the second scripting language code is further adapted to cause a user terminal upon which it is executed to transmit the coordinate information continuously or on a periodic basis.

10. The method of claim 9, wherein the second scripting language code is further adapted to cause a user terminal upon which it is executed to transmit action information defining a clicking action of a user-controlled cursor, and wherein, in response to the clicking action, one of a plurality of browser-based actions is performed based the position of the user controlled cursor within the image as indicated by the coordinate information.

11. The method of claim 1, wherein the webpage includes a plurality of interactive functions, the converting includes maintaining at least one of the plurality of interactive functions and forbidding at least one other of the plurality of interactive functions in the modified markup file, and wherein the web page served as the image includes at least one of the plurality of interactive functions.

12. The method of claim 1, wherein the set of displayable elements includes at least one advertisement.

13. A non-transitory computer readable device, which when executed in an operating system of a computer device, secures a display of advertisements on web browsers while handling an interpreted markup file, the computer program comprising instructions for:
  receiving, in response to a request for a web page by a requestor, a markup file and interpreting the markup file in a virtual machine, the markup file comprising a first scripting language code and a set of displayable elements of the web page;
  converting the set of displayable elements of the markup file interpreted in the virtual machine to a modified markup file including a second scripting language code and the set of displayable elements in the form of at least one corresponding image; and
  serving the image to the requestor as the web page,
  wherein the web page served as the image includes an interactive function, which can be performed by the requestor, which mirrors an original interactive function that can be performed on the web page when not served as an image;
  wherein a decision to convert and serve the web page as an image is independent of any action by the requestor.

14. A system for securing a display of advertisements on web browsers while handling an interpreted markup file, comprising:
  at least one non-transitory computer device, having:
    a system for receiving, in response to a request for a web page by a requestor, a markup file and interpreting the markup file in a virtual machine, the markup file comprising a first scripting language code and a set of displayable elements of the web page; and
    a system, within an operating system of the at least one computer device, for converting the set of displayable elements of the markup file interpreted in the virtual machine to a modified markup file including a second scripting language code and the set of displayable elements in the form of at least one corresponding image; and
    a system for serving the image to the requestor as the web page,
    wherein the web page served as the image includes an interactive function, which can be performed by the requestor, which mirrors an original interactive function that can be performed on the web page when not served as an image;
    wherein a decision to convert and serve the web page as an image is independent of any action by the requestor.

15. The system of claim 14, further comprising:
  a system for altering the image by distorting, greyscaling, re-encoding, resizing, noising, discretizing, resampling or scrambling.

16. The system of claim 14, further comprising:
  a system for dividing the image into a plurality of sub-images.

17. The system of claim 16, further comprising:
  a system for altering one of the plurality of sub-images by distorting, greyscaling, re-encoding, resizing, noising, discretizing, resampling or scrambling.

18. The system of claim 16, further comprising:
  a system for constructing a modified markup file containing the plurality of sub-images, wherein the second scripting language code is adapted to cause a user terminal upon which it is executed to transmit coordinate information defining a position of a user-controlled cursor.

19. The system of claim 18 wherein the second scripting language code is further adapted to cause a user terminal upon which it is executed to transmit the coordinate information continuously or on a periodic basis.

20. The system of claim 19, wherein the second scripting language code is further adapted to cause a user terminal upon which it is executed to transmit action information defining a clicking action of a user-controlled cursor.

21. The system of claim 14, further comprising:
  a system for constructing a modified markup file containing the image, wherein the second scripting language code is adapted to cause a user terminal upon which it is executed to transmit coordinate information defining a position of a user-controlled cursor.

22. The system of claim 21, wherein the second scripting language code is further adapted to cause a user terminal upon which it is executed to transmit the coordinate information continuously or on a periodic basis.

23. The system of claim 22, wherein the second scripting language code is further adapted to cause a user terminal upon which it is executed to transmit action information defining a clicking action of a user-controlled cursor, and wherein, in response to the clicking action, one of a plurality of browser-based actions is performed based the position of the user controlled cursor within the image as indicated by the coordinate information.

* * * * *